(12) United States Patent
Hatanaka et al.

(10) Patent No.: US 9,481,145 B2
(45) Date of Patent: Nov. 1, 2016

(54) PREPREG, METHOD OF MANUFACTURING PREPREG, AND CARBON FIBER-REINFORCED COMPOSITE MATERIAL

(75) Inventors: Kazuhiro Hatanaka, Iyo-gun (JP); Hiroaki Sakata, Iyo-gun (JP); Hiroshi Taiko, Otsu (JP)

(73) Assignee: Toray Industries, Inc., Tokyo (JP)

( * ) Notice: Subject to any disclaimer, the term of this patent is extended or adjusted under 35 U.S.C. 154(b) by 44 days.

(21) Appl. No.: 14/003,916

(22) PCT Filed: Feb. 24, 2012

(86) PCT No.: PCT/JP2012/054522
§ 371 (c)(1),
(2), (4) Date: Sep. 9, 2013

(87) PCT Pub. No.: WO2012/124450
PCT Pub. Date: Sep. 20, 2012

(65) Prior Publication Data
US 2013/0344305 A1    Dec. 26, 2013

(30) Foreign Application Priority Data

Mar. 17, 2011  (JP) .................................. 2011-058793

(51) Int. Cl.
| B32B 5/14 | (2006.01) |
| B32B 37/14 | (2006.01) |
| C08J 5/24 | (2006.01) |
| B32B 5/02 | (2006.01) |
| C08K 3/08 | (2006.01) |

(52) U.S. Cl.
CPC .................. *B32B 5/145* (2013.01); *B32B 5/02* (2013.01); *B32B 37/14* (2013.01); *C08J 5/24* (2013.01); *B32B 2260/046* (2013.01); *B32B 2262/106* (2013.01); *C08J 2300/24* (2013.01); *C08J2363/00* (2013.01); *C08J 2400/22* (2013.01); *C08J 2481/06* (2013.01); *C08K 2003/0806* (2013.01); *Y10T 156/10* (2015.01); *Y10T 428/24893* (2015.01)

(58) Field of Classification Search
CPC ................................................ B32B 2260/046
See application file for complete search history.

(56) References Cited

U.S. PATENT DOCUMENTS

| 5,028,478 A | 7/1991 | Odagiri et al. |
| 2010/0178487 A1 | 7/2010 | Arai et al. |

FOREIGN PATENT DOCUMENTS

| JP | 3-26750 A | 2/1991 |
| JP | 3-124407 A | 5/1991 |
| JP | 2005-314586 A | 11/2005 |
| JP | 2008-231395 A | 10/2008 |
| JP | 2009-62473 A | 3/2009 |
| JP | 2010-53224 A | 3/2010 |
| JP | 2010-508416 A | 3/2010 |
| WO | WO 2008/056123 A1 | 5/2008 |

OTHER PUBLICATIONS

International Search Report Issued in PCT/JP2012/054522 mailed on Apr. 3, 2012.
PCT/ISA/237—Mailed on Apr. 3, 2012, issued in PCT/JP2012/054522.

*Primary Examiner* — Ian Rummel
(74) *Attorney, Agent, or Firm* — Birch Stewart Kolasch & Birch LLP

(57) ABSTRACT

The present invention relates to a sheet-form prepreg which comprises a plurality of carbon fibers and a matrix resin with which the plurality of carbon fibers are impregnated. This matrix resin contains a thermosetting resin, a curing agent, conductive particles of 1 μm or smaller in diameter, conductive particles of 5 μm or larger in diameter and thermoplastic resin particles, and the conductive particles of 1 μm or smaller in diameter, the conductive particles of 5 μm or larger in diameter and the thermoplastic resin particles are each disproportionately distributed in a specific part of the prepreg.
By the present invention, a prepreg from which a carbon fiber-reinforced composite material having both excellent impact resistance and good conductivity in the lamination direction can be produced is provided.

10 Claims, 1 Drawing Sheet

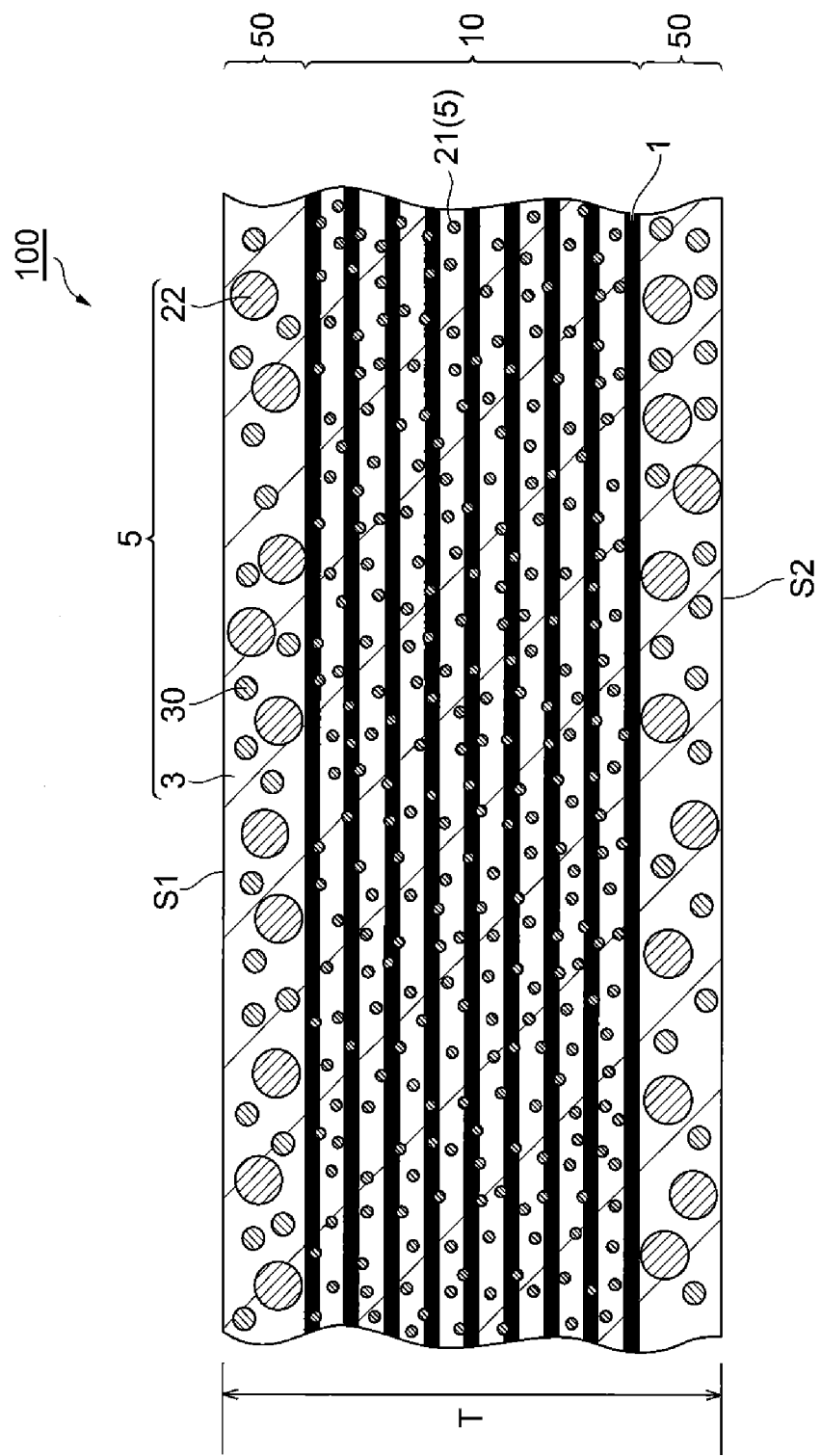

PREPREG, METHOD OF MANUFACTURING PREPREG, AND CARBON FIBER-REINFORCED COMPOSITE MATERIAL

TECHNICAL FIELD

The present invention relates to a prepreg, a method of producing a prepreg, and a carbon fiber-reinforced composite material.

BACKGROUND ART

Carbon fiber-reinforced composite materials are excellent in terms of strength, stiffness, conductivity and the like. Carbon fiber-reinforced composite materials are widely employed in, for example, aircraft structural members, windmill blades, automobile outer panels and computer applications such as IC trays and chassis (housings) of laptop computers, and the demands for such carbon fiber-reinforced composite materials have been increasing every year.

One mode of a carbon fiber-reinforced composite material is a heterogeneous material obtained by molding a prepreg constituted by carbon fibers, which are reinforcing fibers, and a matrix resin. In this case, there is a large difference in the physical properties between the direction of the reinforcing fiber alignment and other directions. For example, it is known that since the impact resistance, which is represented by the resistance to a drop impact, is dictated by the delamination strength quantitatively measured in terms of interlayer plate-edge delamination strength or the like of carbon fiber-reinforced composite material, a mere improvement in the strength of reinforcing fibers does not lead to a drastic improvement of the impact resistance. In particular, a carbon fiber-reinforced composite material comprising a thermosetting resin as its matrix resin reflects a low toughness of the matrix resin and thus has a property of being easily broken under a stress applied from a direction other than the direction of the reinforcing fiber alignment. Therefore, a variety of technologies have been proposed for the purpose of improving the physical properties of a carbon fiber-reinforced composite material capable of withstanding a stress applied from a direction other than the direction of the reinforcing fiber alignment, As one of the technologies, a prepreg in which resin fine particles are dispersed in the surface portion has been proposed. For example, there is proposed a technology for providing a high-toughness composite material having good heat resistance with the use of a prepreg in which resin fine particles composed of a thermoplastic resin such as nylon are dispersed in the surface (see Patent Document 1). Further, there is also proposed a technology for allowing a carbon fiber-reinforced composite material to exhibit toughness at a high level by using a combination of a matrix resin, whose toughness is improved by an addition of a polysulfone oligomer, and resin fine particles composed of a thermosetting resin (see Patent Document 2).

However, in those carbon fiber-reinforced composite materials that are obtained by applying the above-described technologies, although the impact resistance is improved, an insulative resin layer is formed between the layers. Consequently, the conductivity of the resulting prepreg in the lamination direction is very poor.

In view of this, as a method of improving the interlayer conductivity, there have been proposed methods in which metal particles and conductive particles such as carbon particles are incorporated in a matrix resin in advance (see Patent Documents 3 and 4) and a method in which a conductive film is blended with a matrix resin in advance (see Patent Document 5).

PRIOR ART REFERENCES

Patent Documents

[Patent Document 1] U.S. Pat. No. 5,028,478
[Patent Document 2] JP H3-26750 A
[Patent Document 3] JP 2008-231395 A
[Patent Document 4] Japanese Translated PCT Patent Application Laid-open No. 2010-508416
[Patent Document 5] JP 2009-062473 A

SUMMARY OF THE INVENTION

Problems to be Solved by the Invention

In accordance with the increasing demand for high-standard molding technologies and their resulting molded articles, there has been a demand for a prepreg design which attains both impact resistance and conductivity at a higher level. Conventional prepregs cannot sufficiently satisfy such a demand.

In view of the above, the present invention provides a prepreg from which a carbon fiber-reinforced composite material having both excellent impact resistance and good conductivity in the lamination direction can be produced.

Means for Solving the Problems

The present invention relates to a sheet-form prepreg comprising a plurality of carbon fibers and a matrix resin with which the plurality of carbon fibers are impregnated. The matrix resin contains a thermosetting resin, a curing agent, conductive particles and thermoplastic resin particles. The conductive particles include conductive particles of 1 μm or smaller in diameter and conductive particles of 5μm or larger in diameter. In the thickness direction of the prepreg, the conductive particles of 5 μm or larger in diameter are disproportionately distributed in either or both surface layers of the prepreg and the conductive particles of 1 μm or smaller in diameter are disproportionately distributed interior to the carbon fibers that are arranged most closely to the respective principal surfaces of the prepreg.

Further, the present invention relates to a method of producing a prepreg. The method of producing a prepreg according to the present invention comprises the step of arranging a layer of a second resin, which contains a thermosetting resin, a curing agent, second conductive particles of 5 μm or larger in diameter and thermoplastic resin particles, on either or both sides of a sheet-form primary prepreg comprising a plurality of carbon fibers and a first resin with which the plurality of carbon fibers are impregnated, the first resin containing a thermosetting resin, a curing agent and first conductive particles of 1 μm or smaller in diameter.

Still further, the present invention relates to a carbon fiber-reinforced composite material formed from two or more sheet-form prepregs. The carbon fiber-reinforced composite material according to the present invention can be obtained by a method which comprises the step of heating and compressing a laminate containing two or more prepregs. At least two of the prepregs contained in the laminate are the prepregs of the present invention or prepregs that can be obtained by the production method of the present invention, and at least two of the prepregs of the present invention or the prepregs that can be obtained by the production method of the present invention are arranged adjacent to each other.

Effects of the Invention

According to the present invention, a carbon fiber-reinforced composite material which has both excellent impact resistance and good conductivity in the lamination direction is obtained. Further, according to the present invention, a prepreg from which such a carbon fiber-reinforced composite material can be produced is obtained. Moreover, according to the present invention, the prepreg of the present invention can be easily produced.

BRIEF DESCRIPTION OF THE DRAWINGS

FIG. 1 is a cross-sectional view showing one embodiment of the prepreg according to the present invention.

MODE FOR CARRYING OUT THE INVENTION

A suitable embodiment of the present invention will now be described in detail. However, the present invention is not restricted to the following embodiment.

FIG. 1 is a cross-sectional view showing one embodiment of the prepreg according to the present invention. As shown in FIG. 1, a prepreg 100 comprises a plurality of carbon fiber 1s that are paralleled in the form of a sheet, a carbon fiber layer 10 formed by the plurality of carbon fiber 1s, and a matrix resin 5 with which the carbon fiber layer 10 formed by the plurality of carbon fiber 1s is impregnated. The prepreg 100 is a sheet-form prepreg having a pair of opposing principal surfaces, S1 and S2.

The prepreg 100 has inter-formative layer 50s, each of which is a formed in the surface layer on each sides of the principal surfaces S1 and S2 and contains no carbon fiber 1. Because of the effect of the inter-formative layer 50s, when two or more prepregs are laminated to form a carbon fiber-reinforced composite material, an interlayer region containing no carbon fiber is formed between adjacent carbon fiber layer 10s. By allowing thermoplastic resin particle 30s to exist in this interlayer region, the impact resistance of the composite material can be improved. The inter-formative layer 50 may be formed only on either side of the prepreg 100; however, from the standpoint of improving the convenience in the production of a carbon fiber-reinforced composite material, it is preferred that the inter-formative layer 50 be formed on both sides of the prepreg 100. In cases where the inter-formative layer 50 is formed only on one side of the prepreg 100, the thickness of the inter-formative layer 50 is preferably 30% or less, more preferably 20% or less, with respect to the thickness (T) of the prepreg 100. In cases where the inter-formative layer 50 is formed on both sides of the prepreg 100, the thickness of each inter-formative layer 50 is preferably 30% or less, more preferably 20% or less, with respect to the thickness (T) of the prepreg 100.

The thickness of the inter-formative layer is determined by the following method. A plurality of the laminated prepregs are sandwiched in close contact with each other between two polytetrafluoroethylene resin plates having smooth surfaces.

In this condition, the temperature is slowly raised to a curing temperature over a period of 7 days so as to gelatinize and cure the resin, thereby preparing a planar cured prepreg. A cross-sectional photograph of the thus obtained cured prepreg is observed to measure the thickness of the inter-formative layer. Specifically, on the photograph, the distance between adjacent carbon fiber layer 10s is measured at least 10 spots that are arbitrarily selected and the average of the measured values is taken as the thickness of the inter-formative layer.

From the standpoint of allowing a higher conductivity to be expressed, the carbon fiber 1 is preferably a carbon fiber having a tensile elastic modulus of 260 GPa or higher. From the standpoint of attaining both high conductivity and impact resistance, it is preferred that the carbon fiber 1 have a tensile elastic modulus of not higher than 440 GPa. From the same standpoint, the tensile elastic modulus of the carbon fiber 1 is more preferably 280 to 400 GPa. Further, since a composite material having excellent impact resistance, high stiffness and high mechanical strength can be obtained, it is preferred that the carbon fiber 1 be a high-strength high-elongation carbon fiber having a tensile strength of 4.4 to 6.5 GPa and a tensile elongation of 1.7 to 2.3%. Therefore, from the standpoint of attaining both high conductivity and impact resistance, it is most suitable that the carbon fiber 1 be a carbon fiber having a tensile elastic modulus of 280 GPa or higher, a tensile strength of 4.4 GPa and a tensile elongation of 1.7% or higher. The tensile elastic modulus, tensile strength and tensile elongation can be measured by the strand tensile test prescribed in JIS R7601-1986.

The mass ratio of the carbon fibers contained in the prepreg 100 is preferably 40 to 90%, more preferably 50 to 80%. When the mass ratio of the carbon fibers is too low, the weight of the resulting composite material becomes excessively large, so that the advantages of a fiber-reinforced composite material having excellent specific strength and specific elastic modulus may be impaired. Meanwhile, when the mass ratio of the carbon fiber is too high, defective impregnation of the resin occurs, so that the resulting composite material is likely to have a large number of voids and the mechanical characteristics of the composite material may be greatly deteriorated. Further, it is preferred that the mass of the carbon fibers per unit area of the prepreg be 100 to 300 g/m$^2$.

The matrix resin 5 contains an insulative thermosetting resin composition 3, first conductive particle 21s of 1 μm or smaller in diameter, conductive particle 22s of 5 μm or larger in diameter and thermoplastic resin particle 30s.

The first conductive particle 21s are, in the thickness direction of the prepreg 100, disproportionately distributed interior to the carbon fiber 1s that are arranged most closely to the respective principal surfaces, S1 and S2, of the prepreg 100. In other words, the first conductive particle 21s are disproportionately distributed in the carbon fiber layer 10. The phrase "disproportionately distributed in the carbon fiber layer 10" used herein means that more than 50% by mass of the first conductive particle 21s contained in the prepreg 100 exist in the carbon fiber layer 10. It is preferred that 90 to 100% by mass of the first conductive particle 21s contained in the prepreg 100 exist in the carbon fiber layer 10.

The second conductive particle 22s and the thermoplastic resin particle 30s are, in the thickness direction of the prepreg 100, disproportionately distributed in the surface layers of the prepreg 100. The phrase "the second conductive particle 22s are . . . disproportionately distributed in the surface layers" used herein means that, in the thickness direction of the prepreg 100, more than 50% by mass of the second conductive particle 22s and more than 50% by mass of the thermoplastic resin particle 30s, both particle types of which are contained in the prepreg 100, exist within a depth of 20% with respect to the thickness (T) of the prepreg 100 from the respective principal surfaces, S1 and S2. That is, the total amount of those second conductive particle 22s existing within a depth of 20% from the principal surface S1 and those second conductive particle 22s existing within a depth of 20% from the principal surface S2 is greater than 50% by mass. Accordingly, more than 50% by mass of the second conductive particle 22s may exist within a depth of 20% from the principal surface S2, with no second conductive particle 22 existing within a depth of 20% from the principal surface S1. Alternatively, more than 50% by mass of the second conductive particle 22s may exist within a depth of 20% from the principal surface S1, with no second conductive particle 22 existing within a depth of 20% from the principal surface S2. In the same manner, the phrase "the thermoplastic resin particle 30s are . . . disproportionately distributed in the surface layers" means that the total amount of those thermoplastic resin particle 30s existing within a depth of 20% from the principal surface S1 and those thermoplastic resin particle 30s existing within a depth of 20% from the principal surface S2 is greater than 50% by mass.

It is preferred that the second conductive particle 22s be disproportionately distributed outside the carbon fiber layer 10. In other words, it is preferred that the second conductive particle 22s be disproportionately distributed in the inter-formative layer 50. The phrase "the second conductive particle 22s are disproportionately distributed in the inter-formative layer 50" used herein means that more than 50% by mass of the second conductive particle 22s contained in the prepreg 100 exist inside the inter-formative layer 50. That is, the total amount of those second conductive particle 22s existing in the inter-formative layer 50 on the side of the principal surface S1 and those second conductive particle 22s existing in the inter-formative layer 50 on the side of the principal surface S2 is greater than 50% by mass. Accordingly, more than 50% by mass of the second conductive particle 22s may exist in the inter-formative layer 50 on the side of the principal surface S2, with no second conductive particle 22 existing in the inter-formative layer 50 on the side of the principal surface S1. Alternatively, more than 50% by mass of the second conductive particle 22s may exist in the inter-formative layer 50 on the side of the principal surface S1, with no second conductive particle 22 existing in the inter-formative layer 50 on the side of the principal surface S2.

In the same manner, it is preferred that the thermoplastic resin particle 30s be disproportionately distributed outside the carbon fiber layer 10. In other words, it is preferred that the thermoplastic resin particle 30s be disproportionately distributed in the inter-formative layer 50. The detailed meaning of this description is the same as the above explanation provided with regard to that the second conductive particle 22s are disproportionately distributed in the inter-formative layer 50, except that the term "second conductive particle 22s" is replaced with "thermoplastic resin particle 30s".

Further, it is preferred that, in the thickness direction of the prepreg 100, 90 to 100% by mass of the second conductive particle 22s contained in the prepreg 100 exist within a depth of 20% with respect to the thickness (T) of the prepreg 100 from the respective principal surfaces, S1 and S2. That is, it is preferred that the total amount of those second conductive particle 22s existing within a depth of 20% from the principal surface S1 and those second conductive particle 22s existing within a depth of 20% from the principal surface S2 be 90 to 100% by mass. Accordingly, 90 to 100% by mass of the second conductive particle 22s may exist within a depth of 20% from the principal surface S2, with no second conductive particle 22 existing within a depth of 20% from the principal surface S1. Alternatively, 90 to 100% by mass of the second conductive particle 22s may exist within a depth of 20% from the principal surface S1, with no second conductive particle 22 existing within a depth of 20% from the principal surface S2.

In the same manner, it is preferred that, in the thickness direction of the prepreg 100, 90 to 100% by mass of the thermoplastic resin particle 30s contained in the prepreg 100 exist within a depth of 20% with respect to the thickness of the prepreg 100 from the respective principal surfaces, S1 and S2. The detailed meaning of this description is the same as the above explanation provided with regard to that 90 to 100% by mass of the second conductive particle 22s exist within a depth of 20%, except that the term "second conductive particle 22s" is replaced with "thermoplastic resin particle 30s".

When the second conductive particle 22s are disproportionately distributed in the surface layers of the prepreg 100, the second conductive particle 22s contained in the inter-formative layer 50 form conductive paths between adjacent carbon fiber layers, and this is believed to impart a high conductivity in the lamination direction to the carbon fiber-reinforced composite material.

Further, when the thermoplastic resin particle 30s are disproportionately distributed in the surface layers of the prepreg 100, the impact resistance of the carbon fiber-reinforced composite material is improved.

The ratio (abundance ratio) of the first conductive particle 21s existing inside the carbon fiber layer 10, that of the second conductive particle 22s existing within a depth of 20% from the surfaces of the prepreg 100 and that of the thermoplastic resin particle 30s existing in the same region are evaluated by the following method.

With a prepreg being sandwiched between two polytetrafluoroethylene resin plates having smooth surfaces, the temperature is slowly raised to a curing temperature over a period of 7 days so as to gelatinize and cure the resin, thereby preparing a planar cured prepreg. Then, a magnified photograph of a cross-section of the thus obtained cured prepreg is taken in the direction perpendicular to the principal surfaces. On the thus obtained cross-sectional photograph, the total area ($S_{10}$) of the first conductive particles existing over the entire prepreg, the total area ($S_{20}$) of the second conductive particles and the total area ($S_{30}$) of the thermoplastic resin particles are determined. Then, the total area ($S_1$) of the first conductive particles contained in the carbon fiber layer 10 is determined. The ratio (% by mass) of $S_1$ to $S_{10}$ is defined as the ratio (abundance ratio) of the first conductive particles existing inside the carbon fiber layer 10. Further, at a depth of 20% in terms of the thickness of the cured prepreg from the respective surfaces, a total of two lines are drawn parallel to the respective prepreg surfaces. In the spaces between each of these two lines and the respective prepreg surfaces, the total area ($S_2$) of the second conductive particles and the total area ($S_3$) of the thermoplastic resin particles are determined. It is noted here that the second conductive particles and the thermoplastic resin particles that overlap the lines drawn at the depth of 20% are included in the total areas $S_2$ and $S_3$, respectively. The ratio (% by mass) of $S_2$ to $S_{20}$ is defined as the ratio (abundance ratio) of the second conductive particle 22s existing within a depth of 20% from the surfaces of the prepreg 100. The ratio (% by mass) of $S_3$ to $S_{30}$ is defined as the ratio (abundance ratio) of the thermoplastic resin particles existing within a depth of 20% from the surfaces of the prepreg 100.

In the above-described method, the total areas of the respective types of particle can be determined by converting the mass of the particle parts cut out of the cross-sectional photograph. In such a case where it is difficult to distinguish the particles dispersed in the resin after taking the photograph, a means of staining the particles can be adopted as well.

The term "diameter" used herein for a particle means the diameter of the circumscribed circle of the particle, viewing from an arbitrary direction. The diameter of a particle can be measured, for example, on a photograph taken at a magnification of ×1,000 or higher under a microscope such as a scanning electron microscope. The average particle diameter is defined as the average diameter of 50 or more particles that are randomly selected.

The first conductive particle 21s have a diameter of not greater than 1 μm, preferably not greater than 0.5 μm. When the diameter of the first conductive particle 21s is small, there is obtained an effect that the first conductive particle 21s are efficiently dispersed between the carbon fibers. The diameter of the first conductive particle 21s is preferably not less than 0.01 μm. By controlling the diameter of the first conductive particles at not less than 0.01 μm, there is obtained an effect that the particles form a structure with each other and the conductivity is thereby improved.

The second conductive particle 22s have a diameter of preferably not greater than 100 μm, more preferably not greater than 70 μm, particularly preferably not greater than 40 μm. When the diameter of the second conductive particles is excessively large, the alignment of the carbon fibers is disturbed and the interlayer thickness in the carbon fiber-reinforced composite material becomes excessively large, so that the physical properties of the material may be deteriorated. The diameter of the second conductive particle 22s is not less than 5 μm, preferably not less than 10 μm, more preferably not less than 20 μm. When the diameter of the second conductive particles is excessively small, the effect of improving the conductivity tends to be diminished.

The first conductive particle 21 and the second conductive particle 22 may each be a good electric conductor and the shape thereof is not particularly restricted. In addition, these conductive particles are not restricted to those particles that are composed solely of an electric conductor. The first conductive particle 21 and the second conductive particle may be of the same kind or of different kinds. These conductive particles have a volume resistivity value of preferably 10 to $10^{-9}$ Ωcm, more preferably 1 to $10^{-9}$ Ωcm, particularly preferably $10^{-1}$ to $10^{-9}$ Ωcm. The volume resistivity can be calculated from values obtained by setting a sample in a cylindrical cell equipped with a 4-probe electrode and then measuring the thickness and resistance of the sample while applying thereto a pressure of 60 MPa.

The conductive particles are at least one selected from, for example, metal particles, conductive polymer particles (e.g., polyacetylene particles, polyaniline particles, polypyrrole particles, polythiophene particles, poly(isothianaphthene) particles and polyethylenedioxythiophene particles), carbon particles and composite particles which comprise a core particle made of an inorganic material or organic material and a conductive layer coating the core particle. Thereamong, a carbon particle or a composite particle having a core particle made of an inorganic material or organic material and a conductive layer coating the core particle is preferred since such a particle exhibits high conductivity and stability.

Examples of the carbon particle include carbon blacks such as channel black, thermal black, furnace black and ketjen black.

Examples of the inorganic material of the core particle constituting the composite particle include inorganic oxides, inorganic-organic composite materials and carbon. Examples of the inorganic oxides include individual inorganic oxides and composite inorganic oxides containing two or more metals, such as silica, alumina, zirconia, titania, silica-alumina and silica-zirconia. Examples of the inorganic-organic composite materials include polyorganosiloxanes that are obtained by hydrolysis of a metal alkoxide and/or a metal alkylalkoxide. The carbon is preferably crystalline carbon or amorphous carbon. Examples of the amorphous carbon include "BELLPEARL (registered trademark)" C-600, C-800 and C-2000 (manufactured by Air Water Inc.); "NICABEADS (registered trademark)" ICB, PC and MC (manufactured by Nippon Carbon Co., Ltd.); glassy carbon (manufactured by Tokai Carbon Co., Ltd.); high-purity artificial graphite SG Series, SGB Series and SN Series (manufactured by SEC Carbon, Ltd.); and spherical carbon (manufactured by GUN El Chemical Industry Co., Ltd.).

Examples of the organic material of the core particle constituting the composite particle include thermosetting resins such as unsaturated polyester resins, vinylester resins, epoxy resins, benzoxazine resins, phenol resins, urea resins, melamine formaldehyde resins and polyimide resins; and thermoplastic resins such as polyamide resins, phenol resins, amino resins, acrylic resins, ethylene-polyvinyl acetate resins, polyester resins, urea resins, melamine formaldehyde resins, alkyd resins, polyimide resins, polyurethane resins and divinylbenzene resins. Two or more of these resins may be used in combination as well. Thereamong, those acrylic resins and divinylbenzene resins which have excellent heat resistance and those polyamide resins having excellent impact resistance are preferred.

The conductive layer constituting the composite particle as a conductive particle may be any conductive layer as long as it is formed from a material which functions as a good electric conductor and the conductive layer is not necessarily formed solely from an electric conductor. The material constituting the conductive layer has a resistivity value of preferably 10 to $10^{-9}$ Ωcm, more preferably 1 to $10^{-9}$ Ωcm, still more preferably $10^{-1}$ to $10^{-9}$ Ωcm.

A conductive substance constituting the conductive layer is selected from, for example, carbon and metals. The conductive layer may assume the form of a continuous film or an aggregate of fibrous or particulate conductive substance.

The carbon constituting the conductive layer is preferably selected from carbon blacks such as channel black, thermal black, furnace black and ketjen black, hollow carbon fibers and the like.

In cases where the conductive layer is formed from a metal, the conductive layer is preferably a metal layer formed by plating. From the standpoint of enabling to inhibit corrosion of the metal caused by an electric potential difference from the carbon fiber, the metal is selected from platinum, gold, silver, copper, tin, nickel, titanium, cobalt, zinc, iron, chromium, aluminum and a combination of these metals. Thereamong, platinum, gold, silver, copper, tin, nickel and titanium are particularly preferred since they exhibit high conductivity with a volume resistivity of 10 to $10^{-9}$ Ωcm and high stability. These metals may be used individually or in the form of an alloy containing these metals as main components.

The thermoplastic resin particle 30 may assume a spherical form or a non-spherical form such as a fibrous form or a needle form. Further, the thermoplastic resin particle 30 may be porous as well. It is preferred that the thermoplastic resin particle be spherical since the use thereof hardly deteriorates the flow characteristics of the thermosetting resin and is likely to yield a carbon fiber-reinforced composite material which exhibits particularly high impact resistance.

The thermoplastic resin particle 30 is preferably a polyamide particle. Among polyamides, nylon 6, nylon 12, nylon 11 and nylon 6/12 copolymer are preferred since they have an excellent effect of improving the impact resistance of the resulting carbon fiber-reinforced composite material.

The mass ratio of the thermoplastic resin particle $30s$ is preferably in the range of 1 to 1,000 with respect to the mass of the second conductive particle $22s$. When the mass ratio is lower than 1, the effect of improving the impact resistance of the carbon fiber-reinforced composite material tends to be small. Meanwhile, when the mass ratio is higher than 1,000, the effect of improving the conductivity of the carbon fiber-reinforced composite material tends to be small. From the same standpoint, the above-described mass ratio is more preferably in the range of 10 to 500, particularly preferably 10 to 100.

The thermosetting resin composition 3 comprises a thermosetting resin and a curing agent thereof The thermosetting resin is not particularly restricted as long as it is a resin which undergoes a cross-linking reaction when heated and forms, at least partially, a three-dimensional cross-linked structure. The thermosetting resin may be a resin which self-cures when heated, or a resin which is cured by the action of a curing agent and/or a curing accelerator. Examples of such thermosetting resin include unsaturated polyester resins, vinyl ester resins, epoxy resins, benzoxazine resins, phenol resins, urea resins, melamine formaldehyde resins and polyimide resins. Further, denaturation products of these thermosetting resins, resins that are obtained by blending two or more of these thermosetting resins, and the like can also be used.

Among these thermosetting resins, epoxy resins having an excellent balance of heat resistance, mechanical characteristics and adhesion with a carbon fiber are preferred. Particularly, epoxy resins that are obtained by using an amine, a phenol or a compound having a carbon-carbon double bond as a precursor are preferred.

Examples of a glycidyl amine-type epoxy resin obtained by using an amine as a precursor include various isomers of tetraglycidyl diaminodiphenylmethane, triglycidyl-p-aminophenol and triglycidyl aminocresol. Tetraglycidyl diaminodiphenylmethane is preferred as a resin of a composite material used as an aircraft structural material since it has excellent heat resistance.

As the thermosetting resin, a glycidyl ether-type epoxy resin obtained by using a phenol as a precursor is also preferred. Examples of such an epoxy resin include bisphenol A-type epoxy resins, bisphenol F-type epoxy resins, bisphenol S-type epoxy resins, phenol novolac-type epoxy resins, cresol novolac-type epoxy resins and resorcinol-type epoxy resins.

Since those bisphenol A-type epoxy resins, bisphenol F-type epoxy resins and resorcinol-type epoxy resins that are in liquid form have a low viscosity, it is preferred that these epoxy resins be used in combination with other epoxy resin.

As compared to a bisphenol A-type epoxy resin which is in a liquid form at room temperature (about 25° C.), a bisphenol A-type epoxy resin which is solid at room temperature (about 25° C.) yields a structure having a low cross-linking density and thus tends to reduce the heat resistance of the resulting cured resin; however, it tends to improve the toughness of the cured resin. Therefore, it is preferred that a solid bisphenol A-type epoxy resin be used in combination with a glycidyl amine-type epoxy resin, a liquid bisphenol A-type epoxy resin, a bisphenol F-type epoxy resin and the like.

An epoxy resin having a naphthalene skeleton yields a cured resin having a low water absorption rate and a high heat resistance. A biphenyl-type epoxy resin, a dicyclopentadiene-type epoxy resin, a phenol aralkyl-type epoxy resin and a diphenylfluorene-type epoxy resin are also capable of yielding a cured resin having a low water absorption rate. A urethane-modified epoxy resin and an isocyanate-modified epoxy resin can each yield a cured resin having a high fracture toughness and a high elongation.

These epoxy resins may be used individually, or two or more thereof may be used in combination.

As a curing agent of these epoxy resins, a compound having an active group capable of undergoing a reaction with an epoxy group can be employed. As such a curing agent, a compound having an amino group, an acid anhydride group and an azide group is suitable. More specific examples of the curing agent include various isomers of dicyandiamide, diaminodiphenylmethane and diaminodiphenyl sulfone; aminobenzoates; various acid anhydrides; phenol novolac resins; cresol novolac resins; polyphenol compounds; imidazole derivatives; aliphatic amines; tetramethylguanidines; thiourea-added amines; carboxylic acid anhydrides such as methylhexahydrophthalic anhydride; carboxylic acid hydrazides; carboxylic acid amides; polymercaptans; and Lewis acid complexes such as boron trifluoride-ethylamine complex. These curing agents may be used individually, or two or more thereof may be used in combination.

By using an aromatic diamine as the curing agent, a cured resin having good heat resistance can be obtained. Particularly, various isomers of diaminodiphenyl sulfone are most suitable for obtaining a cured resin having good heat resistance. It is preferred that the aromatic diamine be added in an stoichiometrically equivalent amount; however, in some cases, for example, by using the aromatic diamine at an equivalence ratio of about 0.7 to 0.8, a cured resin having a high elastic modulus can be obtained.

Further, by using a combination of dicyandiamide and a urea compound such as 3,4-dichlorophenyl-1,1-dimethylurea, or an imidazole as the curing agent, a cured resin having excellent heat-and-water resistance can be obtained with curing at a relatively low temperature. Curing with the use of an acid anhydride yields a cured resin having a water absorption rate lower than that of a cured resin obtained by curing with an amine compound. In addition, by using a latent curing agent such as a microcapsulated curing agent, the storage stability of the prepreg is improved and in particular, even when the prepreg is left to stand at room temperature, its tackiness properties and draping properties are not likely to be altered.

The thermosetting resin composition 3 may further contain a thermoplastic resin dissolved therein. Generally, it is preferred that this thermoplastic resin be one which has, in its main chain, a bond selected from a carbon-carbon bond, an amide bond, an imide bond, an ester bond, an ether bond, a carbonate bond, a urethane bond, a thioether bond, a sulfone bond and a carbonyl bond. The thermoplastic resin may also partially have a cross-linked structure and/or be non-crystalline while having crystallinity. In particular, it is preferred that the thermoplastic resin be at least one selected from the group consisting of polyamides, polycarbonates, polyacetals, polyphenylene oxides, polyphenylene sulfides, polyarylates, polyesters, polyamide imides, polyimides, polyether imides, polyimides having a phenyltrimethylindane structure, polysulfones, polyether sulfones, polyether ketones, polyether ether ketones, polyaramides, polyether nitriles and polybenzimidazoles.

It is preferred that the prepreg according to the present invention be produced by a method which comprises the steps of: incorporating a first resin, which contains a thermosetting resin, a curing agent and first conductive particles of 1 µm or smaller in diameter, into a plurality of carbon fibers that are paralleled in the form of a sheet, thereby obtaining a sheet-form primary prepreg; and forming, on either or both surfaces of the thus obtained primary prepreg, a layer of a second resin containing a thermosetting resin, a curing agent, second conductive particles of 5 µm or larger in diameter and thermoplastic resin particles.

The first and second resins can be prepared by a conventional method where the respective components are blended and kneaded. In the first and second resins, those components other than the respective conductive particles and the thermoplastic resin particles and the blending ratio thereof may be the same or different.

The primary prepreg can be obtained by, for example, a method which comprises the steps of: forming a film of the first resin by coating the first resin onto a substrate such as a release paper; and laminating the thus obtained film of the first resin on either or both sides of a plurality of carbon fibers that are paralleled in the form of a sheet, and then heating and compressing the resulting laminate to impregnate the carbon fibers with the first resin.

The layer of the second resin (mainly an inter-formative layer) can be formed by, for example, a method which comprises the steps of: forming a film of the second resin by coating the second resin onto a substrate such as a release paper; and pasting the thus obtained layer of the second resin onto either or both surfaces of the primary prepreg.

The ratio of the first conductive particles contained in the first resin is preferably 0.01 to 20% by mass with respect to the mass of the first resin. The ratio of the second conductive particles contained in the second resin is preferably 0.01 to 50% by mass with respect to the mass of the second resin.

The carbon fiber-reinforced composite material according to the present invention has a laminated constitution which comprises two or more of the prepreg according to the present invention. The carbon fiber-reinforced composite material may also contain a layer originated from a prepreg other than the prepreg according to the present invention; however, it is preferred that the carbon fiber-reinforced composite material be constituted solely by the prepreg according to the present invention. Here, "the prepreg according to the present invention" contained in the carbon fiber-reinforced composite material also encompasses a prepreg obtained by the production method according to the present invention.

The carbon fiber-reinforced composite material can be produced by a method which comprises the steps of: forming a laminate which comprises two or more of the prepreg according to the present invention; and heating and compressing the thus obtained laminate to cure the first and second resins contained in the laminate. In the above-described laminate, at least two of the two or more prepregs according to the present invention are laminated adjacent with each other.

The heating and compressing of the laminate can be carried out by, for example, a press molding method, an autoclave molding method, a bag molding method, a wrapping method or an internal pressure molding method. Particularly, an autoclave molding method is preferred since it can yield a molded article having a small amount of voids.

In the resulting carbon fiber-reinforced composite material, an interlayer region which is primarily originated from the inter-formative layer 50 and functions as a spacer, in which interlayer region the thermoplastic resin particle 30s and the second conductive particle 22s are arranged, is formed between two adjacent prepregs according to the present invention.

It is preferred that not less than 30% by number of the second conductive particles existing in this interlayer region be in contact with both of the carbon fibers that are contained in each of the two prepregs and adjacent with each other across the boundary of the adjacent prepregs. By this, a high conductivity can be attained in the lamination direction.

The carbon fiber-reinforced composite material according to the present invention is excellent in strength, stiffness, impact resistance, conductivity and the like; therefore, it can be widely used in, for example, aerospace applications and general industrial applications. More specifically, with regard to the aerospace applications, the carbon fiber-reinforced composite material can be preferably used in the aircraft primary structural members such as fuselages, main wings, tail wings and floor beams; aircraft secondary structural members such as flaps, ailerons, cowls, fairings and interior materials; and artificial satellite structural members such as rocket motor casings. Among these aerospace applications, the carbon fiber-reinforced composite material according to this embodiment can be particularly preferably used in the aircraft primary structural members where impact resistance and light resistance are especially required, particularly fuselage skins, main wing skins and tail wing skins. Further, with regard to the general industrial applications, the carbon fiber-reinforced composite material can be preferably used in, for example, structural materials and drive shafts of vehicles such as cars, ships and railway cars; plate springs; windmill blades; pressure containers; flywheels; papermaking rollers; roofing material; cables; reinforcing bars; computer applications such as IC trays and chassis (housings) of laptop computers; and civil engineering and construction materials such as repair and reinforcement materials. Among these general industrial applications, the carbon fiber-reinforced composite material according to this embodiment can be particularly preferably used in automobile outer panels, ship outer panels, railcar outer panels, windmill blades, IC trays and chassis (housings) of laptop computers.

The present invention is not restricted to the above-described embodiment and can be modified as appropriate within a scope which does not deviate from the gist of the present invention.

EXAMPLES

The present invention will now be described more concretely by way of examples thereof. However, the present invention is not restricted to the following examples.

The followings are described below: the methods of preparing a prepreg and a carbon fiber-reinforced composite material, the method of evaluating the compression after impact and the method of evaluating the volume resistivity. Unless otherwise specified, the preparation and evaluation of a prepreg were performed in an atmosphere having a temperature of 25° C. +2° C. and a relative humidity of 50%.

1. Raw Materials
(1) Carbon Fiber
"TORAYCA (registered trademark)" T800S-24K-10E (number of fibers: 24,000, carbon fiber having a tensile strength of 5.9 GPa, a tensile elastic modulus of 290 GPa and a tensile elongation of 2.0%, total fineness: 1.03 g/m; manufactured by Toray Industries, Inc.)

(2) Matrix Resin
<[A] Thermosetting Resin>
Bisphenol A-type epoxy resin ("jER (registered trademark)" 825 (manufactured by Japan Epoxy Resin Co., Ltd.)
Tetraglycidyl diaminodiphenylmethane (ELM434, manufactured by Sumitomo Chemical Co., Ltd.)
<[B] Curing Agent>
4,4'-diaminodiphenyl sulfone (manufactured by Mitsui Fine Chemicals, Inc.)
<Thermoplastic Resin>
Polyether sulfone having a terminal hydroxyl group, "SUMIKA EXCEL (registered trademark)" PES5003P, (manufactured by Sumitomo Chemical Co., Ltd.)
<[C1] Conductive Particle of 1 μm or Smaller in Diameter (First Conductive Particle)>
Mitsubishi Carbon Black #3030B (carbon black, manufactured by Mitsubishi Chemical Corporation; average particle diameter: 55 nm)
Mitsubishi Carbon Black #3230B (carbon black, manufactured by Mitsubishi Chemical Corporation; average particle diameter: 23 nm)
Carbon ECP (carbon black, manufactured by Lion Corporation; average particle diameter: 40 nm)
Carbon ECP600JD (carbon black, manufactured by Lion Corporation; average particle diameter: 34 nm)
Silver Nanoparticle A (manufactured by DOWA Electronics Materials Co., Ltd.; average particle diameter: 300 nm)
Silver Nanoparticle B (manufactured by DOWA Electronics Materials Co., Ltd.; average particle diameter: 100 nm)
Silver Nanoparticle C (manufactured by DOWA Electronics Materials Co., Ltd.; average particle diameter: 60 nm)
Silver Nanoparticle D (manufactured by DOWA Electronics Materials Co., Ltd.; average particle diameter: 20 nm)
<[C2] Conductive Particle of 5 μm or Larger in Diameter (Second Conductive Particle)>
"NICABEADS (registered trademark)" ICB-2020 (manufactured by Nippon Carbon Co., Ltd.; average particle diameter: 26.69 μm, coefficient of variation: 4.87%)
The particles of the above product were used after repeatedly classifying the particles until the coefficient of variation in terms of particle diameter became 5% or less.
"NICABEADS (registered trademark)" MC-2020 (manufactured by Nippon Carbon Co., Ltd.; average particle diameter: 24.35 μm, coefficient of variation: 2.12%)
The particles of the above product were used after repeatedly classifying the particles until the coefficient of variation in terms of particle diameter became 5% or less.
"NICABEADS (registered trademark)" PC-2020 (manufactured by Nippon Carbon Co., Ltd.; average particle diameter: 25.05 μm coefficient of variation: 3.87%)
The particles of the above product were used after repeatedly classifying the particles until the coefficient of variation in terms of particle diameter became 5% or less.
Glassy carbon (manufactured by Tokai Carbon Co., Ltd.; average particle diameter: 25.57 μm coefficient of variation: 3.83%)
The particles of the above product were used after repeatedly classifying the particles until the coefficient of variation in terms of particle diameter became 5% or less.
Spherical carbon (manufactured by GUN EI Chemical Industry Co., Ltd.) (average particle diameter: 26.27 μm coefficient of variation: 4.18%)
The particles of the above product were used after repeatedly classifying the particles until the coefficient of variation in terms of particle diameter became 5% or less.
Phenol resin particle (carbon particle A obtained by calcinating MARILIN HF-050 (manufactured by GUN El Chemical Industry Co., Ltd.) at 2,000° C. and then repeatedly classifying the thus calcinated particles; average particle diameter: 25.02 μm, coefficient of variation: 3.54%)
Phenol resin particle (carbon particle B obtained by calcinating "BELLPEARL (registered trademark)" R-800 (manufactured by Air Water Inc.) at 2,000° C. and then repeatedly classifying the thus calcinated particles; average particle diameter: 24.37 μm, coefficient of variation: 4.87%)
Phenol resin particle (carbon particle C obtained by calcinating "BELLPEARL (registered trademark)" S-870 (manufactured by Air Water Inc.) at 2,000° C. and then repeatedly classifying the thus calcinated particles; average particle diameter: 26.12 μm, coefficient of variation: 3.11%)
"MICRO PEARL (registered trademark)" AU225 (composite particle comprising a polydivinylbenzene particle and a gold layer covering the polydivinylbenzene particle; average particle diameter: 25.0 μm)
<[D] Thermoplastic Resin Particle>
Nylon 12 particle SP-10 (manufactured by Toray Industries, Inc.; shape: spherical)
An epoxy-modified nylon particle A obtained by the following method.
To a mixed solvent of 300 parts by mass of chloroform and 100 parts by mass of methanol, 90 parts by mass of a transparent polyamide (trade name "GRILAMID (registered trademark)" TR55, manufactured by EMS-CHEMIE Holdings AG), 7.5 parts by mass of an epoxy resin (trade name "jER (registered trademark)" 828, manufactured by Japan Epoxy Resin Co., Ltd.) and 2.5 parts by mass of a curing agent (trade name "TOHMIDE (registered trademark)" #296, manufactured by Fuji Kasei Kogyo Co., Ltd.) were added to obtain a homogeneous solution. Using a paint spray gun, the thus obtained solution was atomized and blown against the liquid surface of 3,000 parts by mass of n-hexane with thorough stirring, thereby allowing the solutes to be precipitated as solid particles. The thus precipitated solid particles were recovered by filtration and thoroughly washed with n-hexane. Then, the solid particles were dried under vacuum to obtain epoxy-modified nylon particles A (average particle diameter: 12.5 μm).
<Coupling Agent>
Z-6011 (3-aminopropyltriethoxysilane, manufactured by Dow Corning Toray Co., Ltd.)
(3) Conductive Film
Conductive film B (thickness: 13.7 μm, volume resistivity value: $3.8 \times 10^{-5}$ Ωcm; the same conductive film as the one described in Example 10 of Patent Document 5)

2. Evaluation Methods
(1) Abundance Ratios of Conductive Particles of 5 μm or Larger in Diameter and Thermoplastic Resin Particles that Exist within a Depth of 20% with Respect to the Thickness of Prepreg Between two polytetrafluoroethylene resin plates, a prepreg was sandwiched in close contact with the smooth surfaces of the polytetrafluoroethylene resin plates. In this condition, the temperature was slowly raised to 150° C. over a period of 7 days to gelatinize and cure the resin contained in the prepreg, thereby preparing a planar test piece containing a cured resin. The thus obtained test piece was cut in the thickness direction and the cross-section was subjected to grinding. Then, the cross-section was observed under a light microscope at a magnification of ×200 or higher to take a photograph thereof in such a manner that the upper and bottom surfaces of the test piece fit in the field of view. By the same operations, the distance between the polytetrafluoroethylene resin plates was measured at 5 spots in the transverse direction of the thus obtained cross-sectional photograph, and the average of the measurements (n=5) was taken as the thickness of the prepreg.

In the cross-sectional photograph, at a depth of 20% in terms of the thickness of the prepreg from the respective surfaces, a total of two lines were drawn parallel to the respective prepreg surfaces. Then, the total area $S_X$ of the conductive particles of 5 μm or larger in diameter existing in the spaces between each of the two lines and the respective prepreg surfaces (total area of both sides) and the total area $S_{X0}$ of the conductive particles of 5 μm or larger in diameter existing over the entire thickness of the prepreg were determined. It is noted here that those conductive particles of 5 μm or larger in diameter overlapping the lines drawn at the depth of 20% were included in the total area $S_X$. The ratio (% by mass) of $S_X$ to $S_{X0}$ was defined as the abundance ratio of the conductive particles of 5 μm or larger in diameter existing within a depth of 20% from the respective prepreg surfaces. In the same manner, the total area $S_Y$ of the thermoplastic resin particles existing in the spaces between each of the two lines and the respective prepreg surfaces (total area of both sides) and the total area $S_{Y0}$ of the thermoplastic resin particles existing over the entire thickness of the prepreg were determined. It is noted here that those thermoplastic resin particles overlapping the lines drawn at the depth of 20% were included in the total area $S_Y$. The ratio (% by mass) of $S_Y$ to $S_{Y0}$ was defined as the abundance ratio of the thermoplastic resin particles existing within a depth of 20% from the respective prepreg surfaces. The total areas of the respective types of particle were determined by converting the mass of the particle parts cut out of the cross-sectional photograph. When it was difficult to distinguish the particles dispersed in the matrix resin after taking the photograph, a means of staining the particles was employed. Further, in the cross-sectional photograph, the conductive particles of 5 μm or larger in diameter and the thermoplastic resin particles were distinguished from each other based on the difference in the contrast.

(2) Abundance Ratio of Conductive Particles of 1 μm or Smaller in Diameter Existing Interior to Carbon Fibers Arranged Most Closely to the Respective Principal Surfaces of Prepreg with Respect to the Thickness Direction A cross-sectional photograph of a prepreg was taken in the same manner as in the above-described (1) to determine the thickness of the prepreg.

In the thus obtained cross-sectional photograph, at each position of the carbon fibers arranged most closely to the respective principal surfaces of the prepreg, a total of two lines were drawn parallel to the respective prepreg surfaces. Then, the total area $S_Z$ of the particles existing between the two lines and the total area $S_{Z0}$ of the particles existing over the entire thickness of the prepreg were determined. The ratio (% by mass) of $S_Z$ to $S_{Z0}$ was defined as the abundance ratio of the conductive particles of 1 μm or smaller in diameter existing interior to the carbon fibers arranged most closely to the respective principal surfaces of the prepreg with respect to the thickness direction. The total areas of the particles were determined by converting the mass of the particle parts cut out of the cross-sectional photograph. When it was difficult to distinguish the particles dispersed in the matrix resin after taking the photograph, a means of staining the particles or a means such as SEM-EDX or TEM was employed.

(3) Measurement of Compression after Impact of Carbon Fiber-Reinforced Composite Material A total of 24 unidirectional prepregs were pseudo-isotropically ply-laminated in the configuration of $[+45°/0°/-45°/90°]_{3S}$. The thus obtained laminate was molded in an autoclave at a temperature of 180° C. for 2 hours under a pressure of 0.59 MPa with a heating rate of 1.5° C./min to prepare 25 planar carbon fiber-reinforced composite materials. From each of the thus obtained composite materials, a sample of 150 mm in length and 100 mm in width (thickness: 4.5 mm) was cut out. Then, in accordance with SACMA SRM 2R-94, a drop impact of 6.7 J/mm was applied to the central part of the thus obtained sample to determine the compression after impact.

(4) Measurement of Conductivity of Carbon Fiber-Reinforced Composite Material

A total of 16 unidirectional prepregs were pseudo-isotropically ply-laminated in the configuration of $[+45°/0°/-45°/90°]_{2S}$. The thus obtained laminate was molded in an autoclave at a temperature of 180° C. for 2 hours under a pressure of 0.59 MPa with a heating rate of 1.5° C./min to prepare 25 planar carbon fiber-reinforced composite materials. From each of the thus obtained composite materials, a sample of 40 mm in length and 40 mm in width (thickness: 3.0 mm) was cut out and the resin layers on both surfaces were removed using a sandblaster. Then, both sides of the resulting sample was coated with a conductive paste ("DOTITE (registered trademark)" D-550, manufactured by Fujikura Kasei Co., Ltd.) to prepare a sample for evaluation of the conductivity. For each of the thus obtained samples, the resistance was measured by a four-terminal method using R6581 digital multimeter (manufactured by Advantest Corporation), and the measured value was defined as the volume resistivity of the carbon fiber-reinforced composite material.

(5) Evaluation of Contact of Conductive Particles Contained Between Carbon Fiber Layers with Each Carbon Fiber The carbon fiber-reinforced composite materials prepared in (4) were each cut in the direction perpendicular to the lamination direction such that the carbon fiber layers could be observed. The resulting cross-section was subjected to grinding and then observed under a laser microscope (KEYENCE VK-9510) at a magnification of ×200 or higher to take a photograph thereof in such a manner that at least two carbon fiber layers fit in the field of view. By the same operations, 100 spots having a conductive particle were arbitrarily selected. The conductive particle was highly likely to be cut at a cross-section of a particle diameter smaller than the average particle diameter; therefore, each conductive particle was regarded to have a size of the average particle diameter. The presence or absence of a contact was evaluated, with a contact being judged to be present when the conductive particle of the above-described size was in contact or intersecting with each carbon fiber. The evaluation criteria were set as follows: "AAA" when, of the 100 conductive particles, the number of the conductive particles that were in contact with both of the interlayer carbon fibers at the upper and lower surfaces was 70 or more (70% or more); "AA" when the number was 50 to 69 (50% to less than 70%); "A" when the number was 30 to 49 (30% to less than 50%); "B" when the number was 3 to 29 (3% to less than 30%); and "C" when the number was 2 or less (less than 3%).

Example 1

[Preparation of First Resin]

In a kneader, 50 parts by mass of an epoxy resin, "jER" 825, and 50 parts by mass of ELM434 were kneaded, and 10 parts by mass PES5003P was added to the resultant and dissolved in the epoxy resin. Then, while kneading the resin, 1 part by mass of Mitsubishi carbon black #3030B was added and subsequently, 40 parts by mass of 4,4'-diaminodiphenyl sulfone was further added to prepare a first resin.

[Preparation of Second Resin]

In a kneader, 50 parts by mass of an epoxy resin, "jER" 825, and 50 parts by mass of ELM434 were kneaded, and 10 parts by mass PES5003P was added to the resultant and dissolved in the epoxy resin. Thereafter, while kneading the resin, 20 parts by mass of the epoxy-modified nylon particle A and 1.5 parts by mass of "NICABEADS " ICB were added. Then, 40 parts by mass of 4,4'-diaminodiphenyl sulfone was further added to prepare a second resin.

[Preparation of Prepreg]

The thus obtained first resin was coated onto a release paper using a knife coater to prepare two resin films having a mass-per-unit-area of 31.5 g/m². Then, the thus obtained two resin films were laminated on both sides of carbon fibers (T800S-24K-10E) that were unidirectionally arranged in the form of a sheet. The resulting laminate was heated and compressed to impregnate the carbon fibers with the first resin, thereby preparing a primary prepreg having a carbon fiber mass-per-unit-area of 190 g/m² and a matrix resin mass ratio of 24.9%.

Thereafter, the thus obtained second resin was coated onto a release paper using a knife coater to prepare two resin films having a mass-per-unit-area of 20.5 g/m². Then, the thus obtained two resin films were laminated on both sides of the primary prepreg obtained in the above. The resulting laminate was heated and compressed to impregnate the carbon fibers with the second resin, thereby preparing a secondary prepreg. The thus obtained secondary prepreg had a carbon fiber mass-per-unit-area of 190 g/m² and a matrix resin mass ratio of 35.4%.

[Evaluation]

For the thus obtained prepreg (secondary prepreg), the abundance ratio (X) of the conductive particles of 5 µm or larger in diameter existing within a depth of 20% from the respective surfaces of the prepreg, the abundance ratio (Y) of the thermoplastic resin particles existing in the same range and the abundance ratio (Z) of the conductive particles of 1 µm or smaller in diameter that were distributed interior to the carbon fibers arranged most closely to the respective principal surfaces of the prepreg with respect to the thickness direction were measured in accordance with the methods described in the above sections of "2.(1)" and "2.(2)". Further, a carbon fiber-reinforced composite material was prepared using the prepreg and, in accordance with the method described in the above section of "2.(3)", "2.(4)" or "2.(5)", the compression after impact, the conductivity (volume resistivity) and the contact of the conductive particles contained between the carbon fiber layers with each carbon fiber were evaluated. The results thereof are shown in Table 1.

Examples 2 to 20

A secondary prepreg was prepared in the same manner as in Example 1, except that the types and the blending ratios of the respective starting materials of the first and second resins were changed as shown in Table 1 to 6. The thus obtained secondary prepreg was then subjected to the measurements and evaluations in the same manner as in Example 1. The results thereof are summarized in Tables 1 to 6.

Example 21

[Preparation of First Resin]

A first resin was prepared in the same manner as in Example 1.

[Preparation of Second Resin]

A second resin was prepared in the same manner as in Example 1.

[Preparation of Prepreg]

A primary prepreg was prepared in the same manner as in Example 1. Then, the second resin was coated onto a release paper using a knife coater to prepare a resin film having a mass-per-unit-area of 41 g/m². The thus obtained resin film was laminated on one side of the thus obtained primary prepreg and the resulting laminate was heated and compressed to impregnate the carbon fibers with the second resin, thereby preparing a secondary prepreg. The thus obtained secondary prepreg had a carbon fiber mass-per-unit-area of 190 g/m² and a matrix resin mass ratio of 35.4%.

[Evaluation]

For the thus obtained prepreg (secondary prepreg), the abundance ratio (X) of the conductive particles of 5 µm or larger in diameter existing within a depth of 20% from the principal surface of the prepreg to which the second resin was laminated, the abundance ratio (Y) of the thermoplastic resin particles existing in the same range and the abundance ratio (Z) of the conductive particles of 1 µm or smaller in diameter that were distributed interior to the carbon fibers arranged most closely to the respective principal surfaces of the prepreg with respect to the thickness direction were measured in accordance with the methods described in the above sections of "2.(1)" and "2.(2)". Further, a carbon fiber-reinforced composite material was prepared using the prepreg and, in accordance with the method described in the above section of "2.(3)", "2.(4)" or "2.(5)", the compression after impact, the conductivity (volume resistivity) and the contact of the conductive particles contained between the carbon fiber layers with each carbon fiber were evaluated. Since the prepreg had the particle layer only on one side, the prepreg was laminated such that the surface having the particle layer faces the same direction. The results are shown in Table 6.

Comparative Examples 1 to 12

A secondary prepreg was prepared in the same manner as in Example 1, except that the types and the blending ratios of the respective starting materials of the first and second resins were changed as shown in Table 7 to 10. The thus obtained secondary prepreg was then subjected to the measurements and evaluations in the same manner as in Example 1. The results thereof are summarized in Tables 7 to 10.

TABLE 1

|  |  | Example 1 | Example 2 | Example 3 | Example 4 |
|---|---|---|---|---|---|
|  | Carbon fiber | T800S | T800S | T800S | T800S |
|  | [A] Thermosetting resin |  |  |  |  |
| First resin | "jER" 825 | 50 | 50 | 50 | 50 |
|  | ELM434 | 50 | 50 | 50 | 50 |
|  | [B] Curing agent |  |  |  |  |
|  | 4,4'-diaminodiphenylsulfone | 40 | 40 | 40 | 40 |
|  | Thermoplastic resin |  |  |  |  |
|  | PES5003P | 10 | 10 | 10 | 10 |
|  | [C1] Conductive particle of 1 μm or smaller in diameter |  |  |  |  |
|  | Mitsubishi carbon black #3030B | 1 |  |  |  |
|  | Mitsubishi carbon black #3230B |  | 1 |  |  |
|  | Carbon ECP |  |  | 1 |  |
|  | Carbon ECP600JD |  |  |  | 1 |
|  | [A] Thermosetting resin |  |  |  |  |
| Second resin | "jER" 825 | 50 | 50 | 50 | 50 |
|  | ELM434 | 50 | 50 | 50 | 50 |
|  | [B] Curing agent |  |  |  |  |
|  | 4,4'-diaminodiphenylsulfone | 40 | 40 | 40 | 40 |
|  | Thermoplastic resin |  |  |  |  |
|  | PES5003P | 10 | 10 | 10 | 10 |
|  | [C2] Conductive particle of 5 μm or larger in diameter |  |  |  |  |
|  | "NICABEADS" ICB-2020 | 1.5 | 1.5 | 1.5 | 1.5 |
|  | "NICABEADS" MC-2020 |  |  |  |  |
|  | "NICABEADS" PC-2020 |  |  |  |  |
|  | Glassy carbon |  |  |  |  |
|  | Spherical carbon |  |  |  |  |
|  | [D] Thermoplastic resin particle |  |  |  |  |
|  | SP-10 |  |  |  |  |
|  | Epoxy-modified nylon particle A | 20 | 20 | 20 | 20 |
| Properties of prepreg | Abundance ratio X (% by mass) | 99 | 98 | 99 | 99 |
|  | Abundance ratio Y (% by mass) | 95 | 92 | 97 | 97 |
|  | Abundance ratio Z (% by mass) | 92 | 91 | 95 | 95 |
|  | Particle mass ratio (*1) | 13.3 | 13.3 | 13.3 | 13.3 |
| Properties of composite material | Compression after impact (MPa) | 295 | 285 | 300 | 305 |
|  | Volume resistivity (Ωcm) | $3.9 \times 10^1$ | $5.8 \times 10^1$ | $4.7 \times 10^1$ | $5.8 \times 10^1$ |
|  | Contact of conductive particle with carbon fibers between layers | AAA | AAA | AAA | AAA |

(*1) The ratio of the mass of the thermoplastic resin particles with respect to the mass of the conductive particles of 5 μm or larger in diameter in the prepreg
(Mass of the thermoplastic resin particles/Mass of the conductive particles of 5 μm or larger in diameter)

TABLE 2

|  |  | Example 5 | Example 6 | Example 7 | Example 8 |
|---|---|---|---|---|---|
|  | Carbon fiber | T800S | T800S | T800S | T800S |
|  | [A] Thermosetting resin |  |  |  |  |
| First resin | "jER" 825 | 50 | 50 | 50 | 50 |
|  | ELM434 | 50 | 50 | 50 | 50 |
|  | [B] Curing agent |  |  |  |  |
|  | 4,4'-diaminodiphenylsulfone | 40 | 40 | 40 | 40 |
|  | Thermoplastic resin |  |  |  |  |
|  | PES5003P | 10 | 10 | 10 | 10 |
|  | [C1] Conductive particle of 1 μm or smaller in diameter |  |  |  |  |
|  | Silver Nanoparticle A | 1 |  |  |  |
|  | Silver Nanoparticle B |  | 1 |  |  |
|  | Silver Nanoparticle C |  |  | 1 |  |
|  | Silver Nanoparticle D |  |  |  | 1 |

TABLE 2-continued

|  |  | Example 5 | Example 6 | Example 7 | Example 8 |
|---|---|---|---|---|---|
| Second resin | [A] Thermosetting resin | | | | |
| | "jER" 825 | 50 | 50 | 50 | 50 |
| | ELM434 | 50 | 50 | 50 | 50 |
| | [B] Curing agent | | | | |
| | 4,4'-diaminodiphenylsulfone | 40 | 40 | 40 | 40 |
| | Thermoplastic resin | | | | |
| | PES5003P | 10 | 10 | 10 | 10 |
| | [C2] Conductive particle of 5 μm or larger in diameter | | | | |
| | "NICABEADS" ICB-2020 | 1.5 | | | |
| | "NICABEADS" MC-2020 | | 1.5 | | |
| | "NICABEADS" PC-2020 | | | 1.5 | |
| | Glassy carbon | | | | |
| | Spherical carbon | | | | 1.5 |
| | [D] Thermoplastic resin particle | | | | |
| | SP-10 | | | | |
| | Epoxy-modified nylon particle A | 20 | 20 | 20 | 20 |
| Properties of prepreg | Abundance ratio X (% by mass) | 98 | 100 | 100 | 100 |
| | Abundance ratio Y (% by mass) | 96 | 95 | 98 | 94 |
| | Abundance ratio Z (% by mass) | 93 | 92 | 91 | 94 |
| | Particle mass ratio (*1) | 13.3 | 13.3 | 13.3 | 13.3 |
| Properties of composite material | Compression after impact (MPa) | 285 | 286 | 288 | 287 |
| | Volume resistivity (Ωm) | $4.6 \times 10^1$ | $5.3 \times 10^1$ | $4.8 \times 10^1$ | $5.2 \times 10^1$ |
| | Contact of conductive particle with carbon fibers between layers | AAA | AAA | AAA | AAA |

(*1) The ratio of the mass of the thermoplastic resin particles with respect to the mass of the conductive particles of 5 μm or larger in diameter in the prepreg
(Mass of the thermoplastic resin particles/Mass of the conductive particles of 5 μm or larger in diameter)

TABLE 3

|  |  | Example 9 | Example 10 | Example 11 |
|---|---|---|---|---|
| | Carbon fiber | T800S | T800S | T800S |
| | [A] Thermosetting resin | | | |
| First resin | "jER" 825 | 50 | 50 | 50 |
| | ELM434 | 50 | 50 | 50 |
| | [B] Curing agent | | | |
| | 4,4'-diaminodiphenylsulfone | 40 | 40 | 40 |
| | Thermoplastic resin | | | |
| | PES5003P | 10 | 10 | 10 |
| | [C1] Conductive particle of 1 μm or smaller in diameter | | | |
| | Mitsubishi carbon black #3030B | 1 | 1 | 1 |
| | Mitsubishi carbon black #3230B | | | |
| | Carbon ECP | | | |
| | Carbon ECP600JD | | | |
| | [A] Thermosetting resin | | | |
| Second resin | "jER" 825 | 50 | 50 | 50 |
| | ELM434 | 50 | 50 | 50 |
| | [B] Curing agent | | | |
| | 4,4'-diaminodiphenylsulfone | 40 | 40 | 40 |
| | Thermoplastic resin | | | |
| | PES5003P | 10 | 10 | 10 |
| | [C2] Conductive particle of 5 μm or larger in diameter | | | |
| | "NICABEADS" ICB-2020 | 1.5 | | |
| | "NICABEADS" MC-2020 | | | |
| | "NICABEADS" PC-2020 | | | |
| | Glassy carbon | | 1.5 | |
| | Spherical carbon | | | 1.5 |

TABLE 3-continued

|  |  | Example 9 | Example 10 | Example 11 |
|---|---|---|---|---|
|  | [D] Thermoplastic resin particle |  |  |  |
|  | SP-10 |  |  |  |
|  | Epoxy-modified nylon particle A | 20 | 20 | 20 |
| Properties of prepreg | Abundance ratio X (% by mass) | 100 | 99 | 98 |
|  | Abundance ratio Y (% by mass) | 96 | 98 | 97 |
|  | Abundance ratio Z (% by mass) | 96 | 98 | 92 |
|  | Particle mass ratio (*1) | 13.3 | 13.3 | 13.3 |
| Properties of composite material | Compression after impact (MPa) | 295 | 302 | 297 |
|  | Volume resistivity (Ωcm) | $4.7 \times 10^1$ | $3.6 \times 10^1$ | $5.7 \times 10^1$ |
|  | Contact of conductive particle with carbon fibers between layers | AAA | AAA | AAA |

(*1) The ratio of the mass of the thermoplastic resin particles with respect to the mass of the conductive particles of 5 μm or larger in diameter in the prepreg
(Mass of the thermoplastic resin particles/Mass of the conductive particles of 5 μm or larger in diameter)

TABLE 4

|  |  | Example 12 | Example 13 | Example 14 | Example 15 |
|---|---|---|---|---|---|
|  | Carbon fiber | T800S | T800S | T800S | T800S |
|  | [A] Thermosetting resin |  |  |  |  |
| First resin | "jER" 825 | 50 | 50 | 50 | 50 |
|  | ELM434 | 50 | 50 | 50 | 50 |
|  | [B] Curing agent |  |  |  |  |
|  | 4,4'-diaminodiphenylsulfone | 40 | 40 | 40 | 40 |
|  | Thermoplastic resin |  |  |  |  |
|  | PES5003P | 10 | 10 | 10 | 10 |
|  | [C1] Conductive particle of 1 μm or smaller in diameter |  |  |  |  |
|  | Mitsubishi carbon black #3030B | 1 | 1 | 1 | 1 |
|  | Mitsubishi carbon black #3230B |  |  |  |  |
|  | Carbon ECP |  |  |  |  |
|  | Carbon ECP600JD |  |  |  |  |
|  | [A] Thermosetting resin |  |  |  |  |
| Second resin | "jER" 825 | 50 | 50 | 50 | 50 |
|  | ELM434 | 50 | 50 | 50 | 50 |
|  | [B] Curing agent |  |  |  |  |
|  | 4,4'-diaminodiphenylsulfone | 40 | 40 | 40 | 40 |
|  | Thermoplastic resin |  |  |  |  |
|  | PES5003P | 10 | 10 | 10 | 10 |
|  | [C2] Conductive particle of 5 μm or larger in diameter |  |  |  |  |
|  | Carbon particle A | 1.5 |  |  |  |
|  | Carbon particle B |  | 1.5 |  |  |
|  | Carbon particle C |  |  | 1.5 |  |
|  | "MICRO PEARL" AU225 |  |  |  | 1.5 |
|  | [D] Thermoplastic resin particle |  |  |  |  |
|  | SP-10 |  |  |  |  |
|  | Epoxy-modified nylon particle A | 20 | 20 | 20 | 20 |
| Properties of prepreg | Abundance ratio X (% by mass) | 99 | 100 | 98 | 99 |
|  | Abundance ratio Y (% by mass) | 95 | 93 | 94 | 96 |
|  | Abundance ratio Z (% by mass) | 93 | 94 | 91 | 93 |
|  | Particle mass ratio (*1) | 13.3 | 13.3 | 13.3 | 13.3 |
| Properties of composite material | Compression after impact (MPa) | 300 | 296 | 299 | 285 |
|  | Volume resistivity (Ωcm) | $3.8 \times 10^1$ | $5.3 \times 10^1$ | $4.3 \times 10^1$ | $5.1 \times 10^1$ |
|  | Contact of conductive particle with carbon fibers between layers | AAA | AAA | AAA | AAA |

(*1) The ratio of the mass of the thermoplastic resin particles with respect to the mass of the conductive particles of 5 μm or larger in diameter in the prepreg
(Mass of the thermoplastic resin particles/Mass of the conductive particles of 5 μm or larger in diameter)

TABLE 5

|  |  | Example 16 | Example 17 |
|---|---|---|---|
|  | Carbon fiber | T800S | T800S |
|  | [A] Thermosetting resin |  |  |
| First resin | "jER" 825 | 50 | 50 |
|  | ELM434 | 50 | 50 |
|  | [B] Curing agent |  |  |
|  | 4,4'-diaminodiphenylsulfone | 40 | 40 |
|  | Thermoplastic resin |  |  |
|  | PES5003P | 10 | 10 |
|  | [C1] Conductive particle of 1 μm or smaller in diameter |  |  |
|  | Mitsubishi carbon black #3030B | 1 | 1 |
|  | Mitsubishi carbon black #3230B |  |  |
|  | Carbon ECP |  |  |
|  | Carbon ECP600JD |  |  |
|  | [A] Thermosetting resin |  |  |
| Second resin | "jER" 825 | 50 | 50 |
|  | ELM434 | 50 | 50 |
|  | [B] Curing agent |  |  |
|  | 4,4'-diaminodiphenylsulfone | 40 | 40 |
|  | Thermoplastic resin |  |  |
|  | PES5003P | 10 | 10 |
|  | [C2] Conductive particle of 5 μm or larger in diameter |  |  |
|  | "NICABEADS" ICB-2020 | 5 | 10 |
|  | "NICABEADS" MC-2020 |  |  |
|  | "NICABEADS" PC-2020 |  |  |
|  | Glassy carbon |  |  |
|  | Spherical carbon |  |  |
|  | [D] Thermoplastic resin particle |  |  |
|  | SP-10 |  |  |
|  | Epoxy-modified nylon particle A | 20 | 20 |
| Properties of prepreg | Abundance ratio X (% by mass) | 100 | 100 |
|  | Abundance ratio Y (% by mass) | 97 | 98 |
|  | Abundance ratio Z (% by mass) | 91 | 92 |
|  | Particle mass ratio (*1) | 4 | 2 |
| Properties of composite material | Compression after impact (MPa) | 285 | 282 |
|  | Volume resistivity (Ωcm) | $4.7 \times 10^1$ | $3.6 \times 10^1$ |
|  | Contact of conductive particle with carbon fibers between layers | AAA | AAA |

(*1) The ratio of the mass of the thermoplastic resin particles with respect to the mass of the conductive particles of 5 μm or larger in diameter in the prepreg
(Mass of the thermoplastic resin particles/Mass of the conductive particles of 5 μm or larger in diameter)

TABLE 6

|  |  | Example 18 | Example 19 | Example 20 | Example 21 |
|---|---|---|---|---|---|
|  | Carbon fiber | T800S | T800S | T800S | T800S |
|  | [A] Thermosetting resin |  |  |  |  |
| First resin | "jER" 825 | 50 | 50 | 50 | 50 |
|  | ELM434 | 50 | 50 | 50 | 50 |
|  | [B] Curing agent |  |  |  |  |
|  | 4,4'-diaminodiphenylsulfone | 40 | 40 | 40 | 40 |
|  | Thermoplastic resin |  |  |  |  |
|  | PES5003P | 10 | 10 | 10 | 10 |
|  | [C1] Conductive particle of 1 μm or smaller in diameter |  |  |  |  |
|  | Mitsubishi carbon black #3030B |  |  | 1 | 1 |
|  | Mitsubishi carbon black #3230B |  |  |  |  |
|  | Carbon ECP |  |  |  |  |

TABLE 6-continued

|  |  | Example 18 | Example 19 | Example 20 | Example 21 |
|---|---|---|---|---|---|
|  | Carbon ECP600JD | 3 | 6 |  |  |
|  | [A] Thermosetting resin |  |  |  |  |
| Second resin | "jER" 825 | 50 | 50 | 50 | 50 |
|  | ELM434 | 50 | 50 | 50 | 50 |
|  | [B] Curing agent |  |  |  |  |
|  | 4,4'-diaminodiphenylsulfone | 40 | 40 | 40 | 40 |
|  | Thermoplastic resin |  |  |  |  |
|  | PES5003P | 10 | 10 | 10 | 10 |
|  | [C2] Conductive particle of 5 μm or larger in diameter |  |  |  |  |
|  | "NICABEADS" ICB-2020 | 1.5 | 1.5 | 1.5 | 1.5 |
|  | "NICABEADS" MC-2020 |  |  |  |  |
|  | "NICABEADS" PC-2020 |  |  |  |  |
|  | Glassy carbon |  |  |  |  |
|  | Spherical carbon |  |  |  |  |
|  | [D] Thermoplastic resin particle |  |  |  |  |
|  | SP-10 |  |  | 20 |  |
|  | Epoxy-modified nylon particle A | 20 | 20 |  | 20 |
| Properties of prepreg | Abundance ratio X (% by mass) | 100 | 100 | 98 | 99 |
|  | Abundance ratio Y (% by mass) | 98 | 98 | 97 | 95 |
|  | Abundance ratio Z (% by mass) | 93 | 93 | 91 | 94 |
|  | Particle mass ratio (*1) | 13.3 | 13.3 | 13.3 | 13.3 |
| Properties of composite material | Compression after impact (MPa) | 297 | 303 | 310 | 296 |
|  | Volume resistivity (Ωcm) | $3.6 \times 10^1$ | $4.8 \times 10^1$ | $3.9 \times 10^1$ | $4.0 \times 10^1$ |
|  | Contact of conductive particle with carbon fibers between layers | AAA | AAA | AAA | AAA |

(*1) The ratio of the mass of the thermoplastic resin particles with respect to the mass of the conductive particles of 5 μm or larger in diameter in the prepreg
(Mass of the thermoplastic resin particles/Mass of the conductive particles of 5 μm or larger in diameter)

TABLE 7

|  |  | Comparative Example 1 | Comparative Example 2 |
|---|---|---|---|
|  | Carbon fiber | T800S | T800S |
|  | [A] Thermosetting resin |  |  |
| First resin | "jER" 825 | 50 | 50 |
|  | ELM434 | 50 | 50 |
|  | [B] Curing agent |  |  |
|  | 4,4'-diaminodiphenylsulfone | 40 | 40 |
|  | Thermoplastic resin |  |  |
|  | PES5003P | 10 | 10 |
|  | [C1] Conductive particle of 1 μm or smaller in diameter |  |  |
|  | Mitsubishi carbon black #3030B |  |  |
|  | Carbon ECP600JD |  |  |
|  | [A] Thermosetting resin |  |  |
| Second resin | "jER" 825 | 50 | 50 |
|  | ELM434 | 50 | 50 |
|  | [B] Curing agent |  |  |
|  | 4,4'-diaminodiphenylsulfone | 40 | 40 |
|  | Thermoplastic resin |  |  |
|  | PES5003P | 10 | 10 |
|  | [C2] Conductive particle of 5 μm or larger in diameter |  |  |
|  | "NICABEADS" ICB-2020 |  |  |
|  | "MICRO PEARL" AU225 |  |  |
|  | [D] Thermoplastic resin particle |  |  |
|  | SP-10 |  | 20 |
|  | Epoxy-modified nylon particle A | 20 |  |
|  | Coupling agent |  |  |
|  | Z-6011 |  |  |
|  | Conductive film |  |  |
|  | Conductive film B |  |  |
| Properties of prepreg | Abundance ratio X (% by mass) | — | — |
|  | Abundance ratio Y (% by mass) | 97 | 96 |
|  | Abundance ratio Z (% by mass) | — | — |
|  | Particle mass ratio (*1) | — | — |
| Properties of composite material | Compression after impact (MPa) | 289 | 343 |
|  | Volume resistivity (Ωcm) | $1.5 \times 10^6$ | $1.4 \times 10^6$ |
|  | Contact of conductive particle with carbon fibers between layers | C | C |

(*1) The ratio of the mass of the thermoplastic resin particles with respect to the mass of the conductive particles of 5 μm or larger in diameter in the prepreg
(Mass of the thermoplastic resin particles/Mass of the conductive particles of 5 μm or larger in diameter)

TABLE 8

|  |  | Comparative Example 3 | Comparative Example 4 | Comparative Example 5 | Comparative Example 6 |
|---|---|---|---|---|---|
|  | Carbon fiber | T800S | T800S | T800S | T800S |
|  | [A] Thermosetting resin |  |  |  |  |
| First resin | "jER" 825 | 50 | 50 | 50 | 50 |
|  | ELM434 | 50 | 50 | 50 | 50 |
|  | [B] Curing agent |  |  |  |  |
|  | 4,4'-diaminodiphenylsulfone | 40 | 40 | 40 | 40 |
|  | Thermoplastic resin |  |  |  |  |
|  | PES5003P | 10 | 10 | 10 | 10 |
|  | [C1] Conductive particle of 1 μm or smaller in diameter |  |  |  |  |
|  | Mitsubishi carbon black #3030B |  |  |  |  |
|  | Carbon ECP600JD |  |  |  |  |
|  | [A] Thermosetting resin |  |  |  |  |
| Second resin | "jER" 825 | 50 | 50 | 50 | 50 |
|  | ELM434 | 50 | 50 | 50 | 50 |
|  | [B] Curing agent |  |  |  |  |
|  | 4,4'-diaminodiphenylsulfone | 40 | 40 | 40 | 40 |
|  | Thermoplastic resin |  |  |  |  |
|  | PES5003P | 10 | 10 | 10 | 10 |
|  | [C2] Conductive particle of 5 μm or larger in diameter |  |  |  |  |
|  | "NICABEADS" ICB-2020 |  |  |  |  |
|  | "MICRO PEARL" AU225 | 0.4 | 1.5 | 5 | 10 |
|  | [D] Thermoplastic resin particle |  |  |  |  |
|  | SP-10 |  |  |  |  |
|  | Epoxy-modified nylon particle A | 20 | 20 | 20 | 20 |
|  | Coupling agent |  |  |  |  |
|  | Z-6011 |  |  |  |  |
|  | Conductive film |  |  |  |  |
|  | Conductive film B |  |  |  |  |
| Properties of prepreg | Abundance ratio X (% by mass) | 100 | 99 | 99 | 100 |
|  | Abundance ratio Y (% by mass) | 98 | 97 | 96 | 98 |
|  | Abundance ratio Z (% by mass) | — | — | — | — |
|  | Particle mass ratio (*1) | 50 | 13.3 | 4 | 2 |
| Properties of composite material | Compression after impact (MPa) | 290 | 291 | 285 | 280 |
|  | Volume resistivity (Ωcm) | $1.1 \times 10^3$ | $3.2 \times 10^2$ | $5.1 \times 10^2$ | $2.5 \times 10^2$ |
|  | Contact of conductive particle with carbon fibers between layers | AA | AAA | AAA | AAA |

(*1) The ratio of the mass of the thermoplastic resin particles with respect to the mass of the conductive particles of 5 μm or larger in diameter in the prepreg
(Mass of the thermoplastic resin particles/Mass of the conductive particles of 5 μm or larger in diameter)

TABLE 9

|  |  | Comparative Example 7 | Comparative Example 8 | Comparative Example 9 |
|---|---|---|---|---|
|  | Carbon fiber | T800S | T800S | T800S |
|  | [A] Thermosetting resin |  |  |  |
| First resin | "jER" 825 | 50 | 50 | 50 |
|  | ELM434 | 50 | 50 | 50 |
|  | [B] Curing agent |  |  |  |
|  | 4,4'-diaminodiphenylsulfone | 40 | 40 | 40 |
|  | Thermoplastic resin |  |  |  |
|  | PES5003P | 10 | 10 | 10 |

TABLE 9-continued

|  |  | Comparative Example 7 | Comparative Example 8 | Comparative Example 9 |
|---|---|---|---|---|
|  | [C1] Conductive particle of 1 μm or smaller in diameter |  |  |  |
|  | Mitsubishi carbon black #3030B |  |  |  |
|  | Carbon ECP600JD | 1 | 3 | 6 |
|  | [A] Thermosetting resin |  |  |  |
| Second resin | "jER" 825 | 50 | 50 | 50 |
|  | ELM434 | 50 | 50 | 50 |
|  | [B] Curing agent |  |  |  |
|  | 4,4'-diaminodiphenylsulfone | 40 | 40 | 40 |
|  | Thermoplastic resin |  |  |  |
|  | PES5003P | 10 | 10 | 10 |
|  | [C2] Conductive particle of 5 μm or larger in diameter |  |  |  |
|  | "NICABEADS" ICB-2020 |  |  |  |
|  | "MICRO PEARL" AU225 |  |  |  |
|  | [D] Thermoplastic resin particle |  |  |  |
|  | SP-10 |  |  |  |
|  | Epoxy-modified nylon particle A | 20 | 20 | 20 |
|  | Coupling agent |  |  |  |
|  | Z-6011 |  |  |  |
|  | Conductive film |  |  |  |
|  | Conductive film B |  |  |  |
| Properties of prepreg | Abundance ratio X (% by mass) | — | — | — |
|  | Abundance ratio Y (% by mass) | 96 | 97 | 96 |
|  | Abundance ratio Z (% by mass) | 92 | 91 | 91 |
|  | Particle mass ratio (*1) | — | — | — |
| Properties of composite material | Compression after impact (MPa) | 286 | 283 | 282 |
|  | Volume resistivity (Ωcm) | $7.1 \times 10^3$ | $5.2 \times 10^2$ | $3.1 \times 10^2$ |
|  | Contact of conductive particle with carbon fibers between layers | C | C | C |

(*1) The ratio of the mass of the thermoplastic resin particles with respect to the mass of the conductive particles of 5 μm or larger in diameter in the prepreg
(Mass of the thermoplastic resin particles/Mass of the conductive particles of 5 μm or larger in diameter)

TABLE 10

|  |  | Comparative Example 10 | Comparative Example 11 | Comparative Example 12 |
|---|---|---|---|---|
|  | Carbon fiber | T800S | T800S | T800S |
|  | [A] Thermosetting resin |  |  |  |
| First resin | "jER" 825 | 50 | 50 | 50 |
|  | ELM434 | 50 | 50 | 50 |
|  | [B] Curing agent |  |  |  |
|  | 4,4'-diaminodiphenylsulfone | 40 | 40 | 40 |
|  | Thermoplastic resin |  |  |  |
|  | PES5003P | 10 | 10 | 10 |
|  | [C1] Conductive particle of 1 μm or smaller in diameter |  |  |  |
|  | Mitsubishi carbon black #3030B |  |  |  |
|  | Carbon ECP600JD | 1 |  |  |
|  | [A] Thermosetting resin |  |  |  |
| Second resin | "jER" 825 | 50 | 50 | 50 |
|  | ELM434 | 50 | 50 | 50 |
|  | [B] Curing agent |  |  |  |
|  | 4,4'-diaminodiphenylsulfone | 40 | 40 | 40 |
|  | Thermoplastic resin |  |  |  |
|  | PES5003P | 10 | 10 | 10 |

TABLE 10-continued

|  |  | Comparative Example 10 | Comparative Example 11 | Comparative Example 12 |
|---|---|---|---|---|
|  | [C2] Conductive particle of 5 μm or larger in diameter |  |  |  |
|  | "NICABEADS" ICB-2020 |  |  |  |
|  | "MICRO PEARL" AU225 |  | 0.4 |  |
|  | [D] Thermoplastic resin particle |  |  |  |
|  | SP-10 |  |  |  |
|  | Epoxy-modified nylon particle A | 20 | 20 | 20 |
|  | Coupling agent |  |  |  |
|  | Z-6011 |  | 0.075 |  |
|  | Conductive film |  |  |  |
|  | Conductive film B |  |  | 4 |
| Properties of prepreg | Abundance ratio X (% by mass) | — | 99 | — |
|  | Abundance ratio Y (% by mass) | 97 | 95 | 98 |
|  | Abundance ratio Z (% by mass) | 93 | — | — |
|  | Particle mass ratio (*1) | — | 50 | — |
| Properties of composite material | Compression after impact (MPa) | 287 | 298 | 295 |
|  | Volume resistivity (Ωcm) | $8.5 \times 10^3$ | $5.8 \times 10^3$ | $4.0 \times 10^3$ |
|  | Contact of conductive particle with carbon fibers between layers | C | AA | AAA |

(*1) The ratio of the mass of the thermoplastic resin particles with respect to the mass of the conductive particles of 5 μm or larger in diameter in the prepreg
(Mass of the thermoplastic resin particles/Mass of the conductive particles of 5 μm or larger in diameter)

As shown in Tables 1 to 6, the prepregs that were prepared in Examples all had particle abundance ratios X and Y of higher than 90% by mass. That is, in the thickness direction of these prepregs, the conductive particles of 5 μm or larger in diameter and the thermoplastic resin particles were disproportionately distributed in the surface layers. In addition, the particle abundance ratio Z was also higher than 90% by mass. That is, it was confirmed that, in the thickness direction of these prepregs, 90% by mass of the conductive particles of 1 μm or smaller in diameter were distributed interior to the carbon fibers arranged most closely to the respective principal surfaces of the prepregs.

As clearly seen from the above-described experimental results, by using the prepreg according to each Example, which was prepared with the first resin containing the first conductive particles (C1) of 1 μm or smaller in diameter and the second resin containing the second conductive particles (C2) of 5 μm or larger in diameter, a carbon fiber-reinforced composite material having a high conductivity can be produced. Furthermore, it was confirmed that an excellent impact resistance can be achieved because of a synergistic effect between the second conductive particles (C2) and the thermoplastic resin particles.

DESCRIPTION OF SYMBOLS

1: Carbon fiber
3: Thermosetting resin composition
5: Matrix resin
10: Carbon fiber layer
21: First conductive particle (conductive particle of 1 μm or smaller in diameter)
22: Second conductive particle (conductive particle of 5 μm or larger in diameter)
30: Thermoplastic resin particle
50: Inter-formative layer
100: Prepreg
S1 and S2: Principal surfaces of prepreg

The invention claimed is:

1. A prepreg, which is in the form of a sheet and comprises a plurality of carbon fibers and a matrix resin with which said plurality of carbon fibers are impregnated,
    wherein, said carbon fibers are parallel in the form of a sheet;
    said matrix resin comprises a thermosetting resin, a curing agent, conductive particles and thermoplastic resin particles;
    said conductive particles include conductive particles of 1 μm or smaller in diameter and conductive particles of 5 μm or larger in diameter;
    said conductive particles of 5 μm or larger in diameter and said thermoplastic resin particles are disproportionately distributed in either or both surface layers of said prepreg in the thickness direction of said prepreg; and
    said conductive particles of 1 μm or smaller in diameter are disproportionately distributed interior to said carbon fibers that are arranged most closely to the respective principal surfaces of said prepreg in said thickness direction of said prepreg,
    wherein the mass ratio of the carbon fibers contained in the prepreg is 40 to 80%,
    and the mass of the carbon fibers per unit area of the prepreg is 100 to 300g/m².

2. The prepreg according to claim 1, wherein, in said thickness direction of said prepreg, 90 to 100% by mass of said conductive particles of 1 μm or smaller in diameter that are contained in said prepreg exist interior to said carbon fibers that are arranged most closely to said respective principal surfaces of said prepreg.

3. The prepreg according to claim 1, wherein, in said thickness direction of said prepreg, 90 to 100% by mass of said conductive particles of 5 μm or larger in diameter and 90 to 100% by mass of said thermoplastic resin particles, both particle types of which are contained in said prepreg, exist within a depth of 20% with respect to the thickness of said prepreg from said respective principal surfaces of said prepreg.

4. The prepreg according to claim 2, wherein, in said thickness direction of said prepreg, 90 to 100% by mass of said conductive particles of 5 μm or larger in diameter and 90 to 100% by mass of said thermoplastic resin particles, both particle types of which are contained in said prepreg, exist within a depth of 20% with respect to the thickness of said prepreg from one of said principal surfaces of said prepreg.

5. The prepreg according to claim 1, wherein said conductive particles are at least one selected from the group consisting of carbon particles and composite particles comprising a core particle made of an inorganic material or an organic material and a conductive layer coating the core particle.

6. The prepreg according to claim 1, wherein the ratio of the mass of said thermoplastic resin particles to the mass of said conductive particles of 5 μm or larger in diameter is in the range of 1 to 1,000.

7. A prepreg, which is in the form of a sheet and comprises a plurality of carbon fibers and a matrix resin with which said plurality of carbon fibers are impregnated,
wherein, said carbon fibers are paralleled in the form of a sheet;
said matrix resin comprises a thermosetting resin, a curing agent, conductive particles and thermoplastic resin particles;
said conductive particles include conductive particles of 0.01-0.5μm in diameter and conductive particles of 5 μm or larger in diameter;
said conductive particles of 5 μm or larger in diameter and said thermoplastic resin particles are disproportionately distributed in either or both surface layers of said prepreg in the thickness direction of said prepreg; and
in said thickness direction of said prepreg, 90 to 100% by mass of said conductive particles of 0.01-0.5μm in diameter that are contained in said prepreg exist interior to said carbon fibers that are arranged most closely to said respective principal surfaces of said prepreg,
wherein the mass ratio of the carbon fibers contained in the prepreg is 40 to 80%,
and the mass of the carbon fibers per unit area of the prepreg is 100 to 300g/m².

8. The prepreg according to claim 1 wherein said conductive particles of 5 μm or larger are carbon particles.

9. The prepreg according to claim 1 wherein the coefficient of variation in terms of said conductive particles of 5 μm or larger in diameter is 5% or less.

10. The prepreg according to claim 1 wherein the second conductive particles have a diameter of not greater than 40μm and not less than 20μm.

* * * * *